Sept. 6, 1960      E. H. ARNOLD, JR      2,951,703
MAGNETIC MARKERS
Filed April 10, 1958
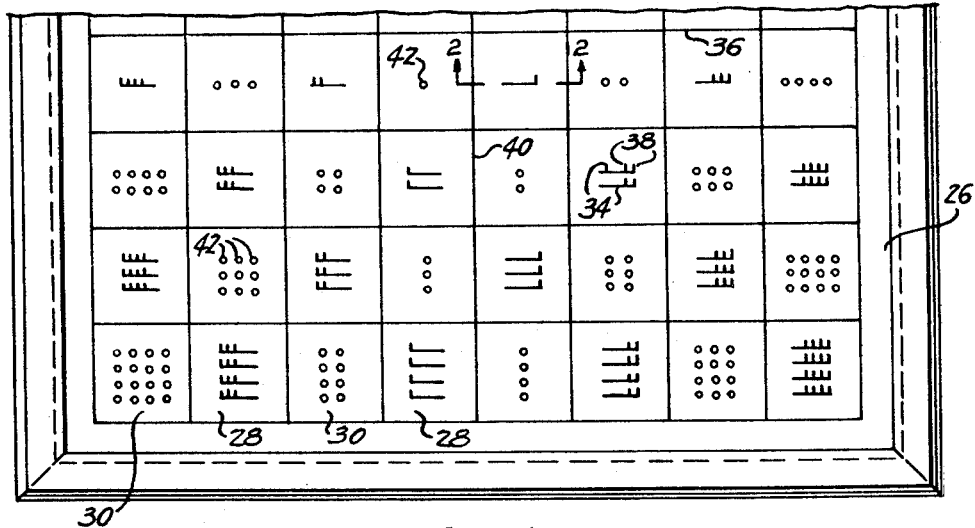
FIG.1
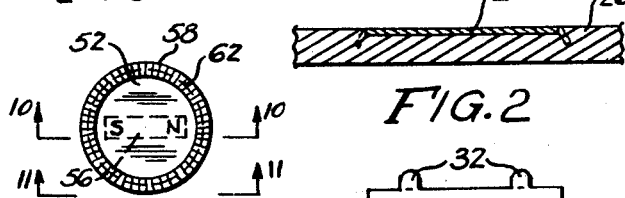
FIG.2
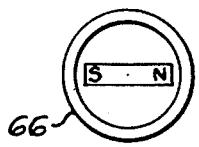
FIG.5
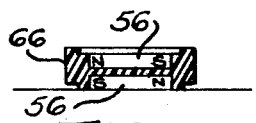
FIG.6
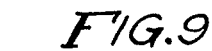
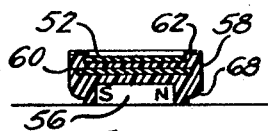
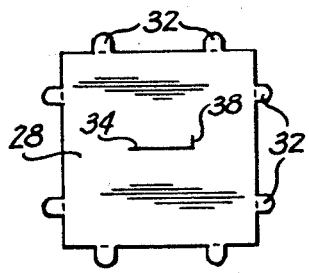
FIG.9    FIG.3
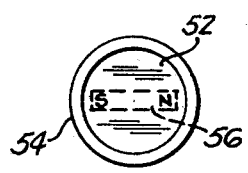
FIG.7
FIG.10
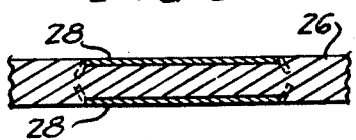
FIG.11    FIG.4
FIG.8
INVENTOR
EDWARD H. ARNOLD, Jr.
BY *E.E. Vrooman & Leo.*
ATTORNEYS

United States Patent Office 2,951,703
Patented Sept. 6, 1960

2,951,703

MAGNETIC MARKERS

Edward H. Arnold, Jr., 606 Pine St., New Orleans 18, La.

Filed Apr. 10, 1958, Ser. No. 727,567

2 Claims. (Cl. 273—137)

The present invention relates to magnetic markers, such as are used in playing checkers, dominoes, chess or in arranging markets on signs and display boards, such as menus, announcements, etc.

The present invention is an improvement in the markers which provides simplicity of structure coupled with optimum usefulness.

The principal object of this invention is to make a marker with a permanent magnet having its poles exposed in a flat bottom of the marker, adaptable for direct contact with the surface, whereby the external flux of the magnet affecting other markers in its proximity will be minimized when the marker is applied to the board.

A further object is to minimize the size of magnets required by providing such direct contact between the magnetic surface of the board and the pole surfaces of the magnet.

A further object is to provide peripheral grooves around the bottoms of the checkers and corresponding ridges around the tops thereof, for holding a checker against sliding off another on which it is placed, as in crowning a king.

A further object is to inlay a sheet of magnetic material in the upper flat surface of the checkers, not only to assist in holding stacked checkers against accidental displacement, but also to provide a concentration of the flux on the outside of the magnet within the individual checker, thus reducing the flux externally of the checker even before the checker is placed on the magnetic surface of the board.

A further object is to insert a second flat sheet of magnetic material in the above form of checker structure for further reducing the external flux of the bottom checker under stacked checker conditions.

Other and more specific objects will appear in the following detailed description of several modifications of the present invention, as illustrated in the accompanying drawings, wherein:

Figure 1 illustrates in part, one form of the checkerboard.

Figure 2 is an enlarged sectional detail taken on line 2—2 of Figure 1.

Figure 3 is a plan view of the square sheet of magnetic material covering one of the playing squares on the checkerboard.

Figure 4 is a sectional detail of a modified board, through one of its playing squares.

Figures 5 and 6 show a form of checker, having magnet bars in both the lower and upper faces.

Figures 7 and 8 show another form of checker having a magnet bar in its lower face and magnetic material in its upper face.

Figure 9 is a plan view of still another modification of checkers, having a bar magnet in its lower face and magnetic material in its upper face, plus another sheet of magnetic material embedded in the checker to reduce the external flux from the bar magnet.

Figure 10 is a sectional view taken on the line 10—10 of Figure 9, and

Figure 11 is a side view of this form taken on the line 11—11 in Figure 9.

The present invention, although illustrated in several forms, by a checkerboard and checkers, is similarly applicable to chess, dominoes, and other games requiring a board and markers movable thereon, as well as to sign or display boards of a similar nature, where the markers may represent letters, numerals, etc.

Devices of this general nature previously used have been expensive, complicated and/or not satisfactory in operation, especially under adverse conditions of use, such as in moving conveyances or in crowded quarters where the boards may be subjected to frequent jars tending to accidentally displace the markers. In the case of checkers or chess, it is often difficult to return the markers to their places after a disturbance under such conditions, and the game is spoiled.

The checkerboards and checkers illustrating the present invention are simple in construction, requiring very small permanent magnets, which are so arranged that they produce a minimum of external flux laterally of the checkers, thus eliminating any tendency of one checker, moved into the vicinity of another, to move the latter from its position.

Figure 1 shows one form of board made of non-magnetic material 26 having sheets 28 of magnetic material fixed to it in the playing squares having the non-playing squares 30 set off therebetween. Ears 32 may be provided around the edges of sheets 28 to facilitate their attachment to the surface of the board as shown in Figure 2. Sheets 28 and squares 30 may be engraved as shown, indicating their positions relative to the axes of the board, the number of horizontal lines 34 engraved on a sheet indicating the row it is in, away from the horizontal axis 36 of the board, and the number of vertical notches 38 at one end of these lines 34 indicating the vertical row it is in, away from the vertical axis 40 of the board to the corresponding side. The non-playing squares 30 may be punched to indicate their positions with respect to the horizontal and vertical axes 36 and 40, by the number of horizontal rows of punches 42 and the number of punches in each row respectively. Thus a blind player feeling the engraving on any square can immediately ascertain its position on the board, and whether it is a playing or non-playing square.

A sheet of magnetic material 52 may be inlaid in the upper surface of a checker 54, as shown in Figures 7 and 8. This sheet may overhang the ends of the bar magnet 56 and will concentrate its magnetic flux between the magnet poles so as to reduce its flux laterally of the checkers, thus to reduce its reaction with neighboring checkers. In stacked checkers, this sheet 42 also helps to hold the upper checker against displacement and further reduce its remaining external flux.

A modified checker 58 may be seen in Figures 9 to 11, wherein a second sheet of magnetic material 60 is cast inside the checker between the bar magnet 56 and the upper sheet 52. Sheet 60 will continue to effectively concentrate the flux of the magnet bar 56 even if another checker is placed on top of it and before the lower checker is placed in contact with the board, so that adjacent checkers will not be affected by it before board contact is made. Checker 58 may be provided with a knurled ridge 62 and knurled peripheral surface 64 around the upper edge of the checker, or this edge may be otherwise sensibly deformed in different ways in the set of checkers for each player, to enable blind players to recognize their own checkers.

Another form of checker 66 is shown in Figures 5 and 6, wherein a bar magnet 56 is set in the top surface with its poles oriented in opposed relation to the lower bar magnet 56. Distinctive markings on the peripheries of these checkers may designate the positions of the N and S poles on the outer walls of the checkers, so that when placing one checker on another, opposite poles may be brought together in the contacting surfaces for best attraction. These markings may also be advantageously used on checkers 44 illustrated in Figures 2 to 4.

Additional sheets 28, without engravings, may be fixed to the bottom of the board 26 (Fig. 4), preferably opposite the playing squares, near each player's side of the board, for use in storing his spare checkers while playing.

The lower edge of the outer wall of the checkers may be chamfered as shown at 68 in Figure 11, to facilitate prying the checker up from its contact surface with the finger nail.

Many other modifications in detail structure of the several parts illustrated may be made without departing from the spirit and scope of the present invention as defined in the appended claims.

What is claimed is:

1. A checker comprising a non-magnetic body, a bar magnet set into its bottom and having its pole surfaces coplanar with said bottom and a disc of magnetic material inlaid in its top, an annular cut away portion around the periphery of the bottom and a matching ridge around the top of each checker for interlocked stacking of the checkers.

2. A checker as defined in claim 1, wherein said disc is of sufficient diameter to overhang the ends of said bar magnet.

References Cited in the file of this patent

UNITED STATES PATENTS

| | | |
|---|---|---|
| 1,605,703 | Brown | Nov. 2, 1926 |
| 2,399,041 | Kleber | Apr. 23, 1946 |
| 2,511,774 | Goldsmith | June 13, 1950 |
| 2,665,913 | Hlavac | Jan. 12, 1954 |